UNITED STATES PATENT OFFICE.

EMILE F. LOISEAU, OF MAUCH CHUNK, PENNSYLVANIA.

IMPROVEMENT IN THE MANUFACTURE OF ARTIFICIAL FUEL FROM COAL-WASTE.

Specification forming part of Letters Patent No. 147,664, dated February 17, 1874; application filed October 4, 1873.

*To all whom it may concern:*

Be it known that I, EMILE F. LOISEAU, of Mauch Chunk, in the county of Carbon and State of Pennsylvania, have invented a new and useful Improvement in Process for Manufacturing Artificial Fuel from Waste Coal, of which the following is a specification:

The waste of the coal-mine or coal-yard is by my process converted into solid inodorous lumps of fuel, preferably in the shape or form of an egg, to be used for all the purposes of ordinary fuel. The coal-waste is mixed with a certain percentage of clay or similar substance, which has previously been dried and ground by any suitable apparatus, and is discharged under an elevator, where it is moistened with milk of lime or other suitable liquid, and is carried in a moist state to a stationary cylinder, in which works a screw-propeller or other equivalent device, by which it is forced into a mixer, where the coal dust or waste is worked into a plastic mass, and discharged through suitable openings into the pug-mill of a molding-press, and forced between two molding-rollers to be pressed into lumps. From the molding-rollers the lumps are carried by an endless belt to the drying-oven, and, being dried, they fall into the buckets of another elevator, and are discharged into a waterproofing apparatus.

In this apparatus a liquid composed of rosin or any other resinous or oleaginous material dissolved in benzine or other liquid is kept at a certain level in a suitable tank, through which passes a belt, which carries the lumps of fuel. As the belt revolves, the lumps are immersed in said liquid, and discharged into a drying tunnel or oven, where the benzine and volatile portions of the coating-liquid are evaporated either by artificial heat or by a current of dry air. The volatile portion of the coating-liquid may be left to evaporate by exposure to the air; but I prefer to use artificial means to hasten the completion of the process. From the drying-oven the artificial fuel is delivered onto a chute and into the coal car or cart, ready for use. The whole operation is performed automatically, and the fuel is constantly in motion.

This fuel may be used for grates, boiler-furnaces, ranges, and stoves. It is free from slate, emits no unpleasant odor, does not clinker, and throws no sparks.

I do not confine myself to any particular apparatus for carrying out my process, which consists, as before stated, in mixing, molding, drying, and waterproofing, and preparing for use waste coal by a continuous operation automatically performed.

Having thus described my invention, I claim as new and desire to secure by Letters Patent—

The process of manipulating coal-waste to convert it into a convenient fuel form by first mixing it with clay, then molding then drying, and finally waterproofing it in the manner described.

EMILE F. LOISEAU.

Witnesses:
T. B. MOSHER,
ALEX. F. ROBERTS.